Patented Mar. 11, 1947

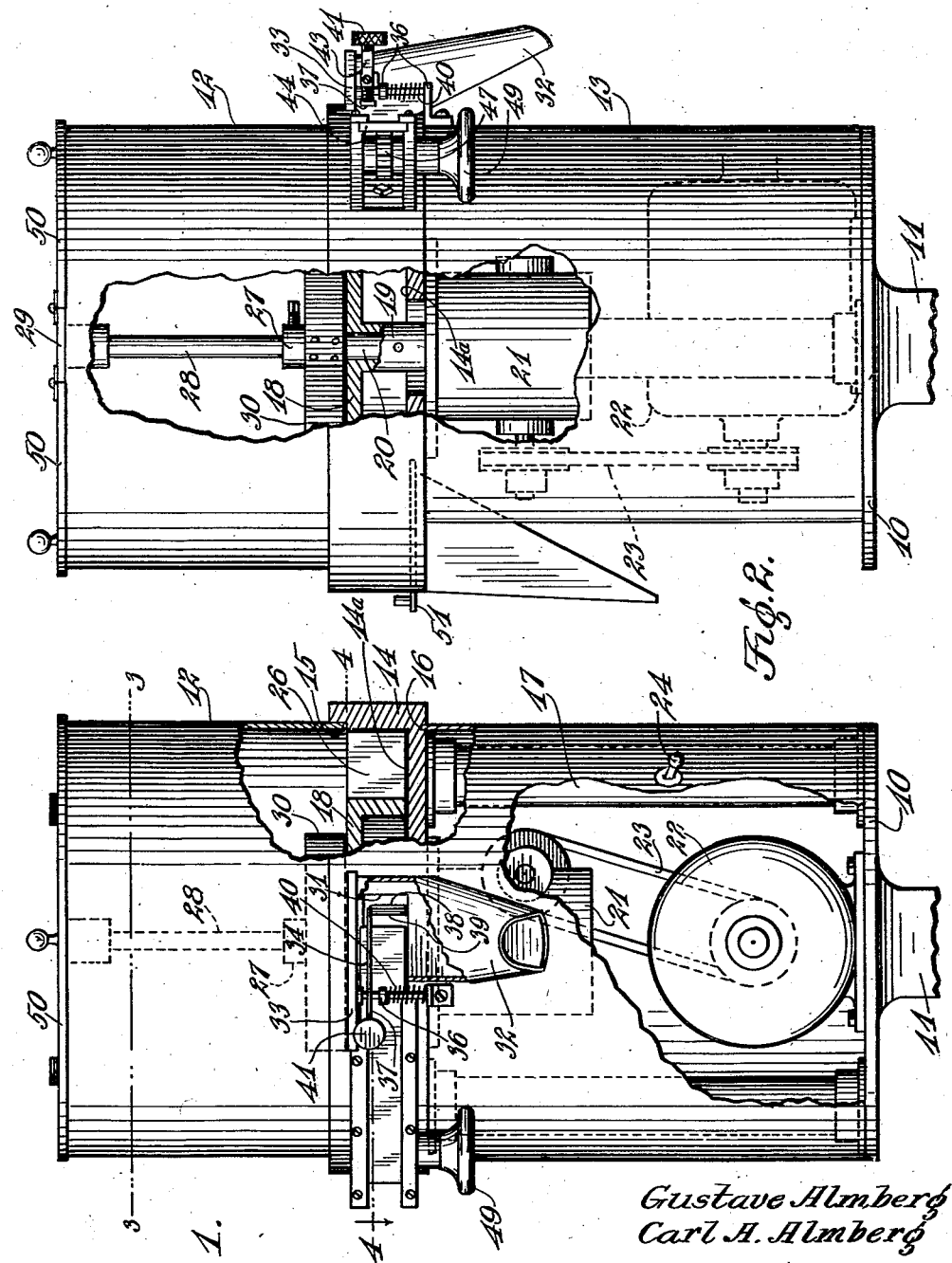

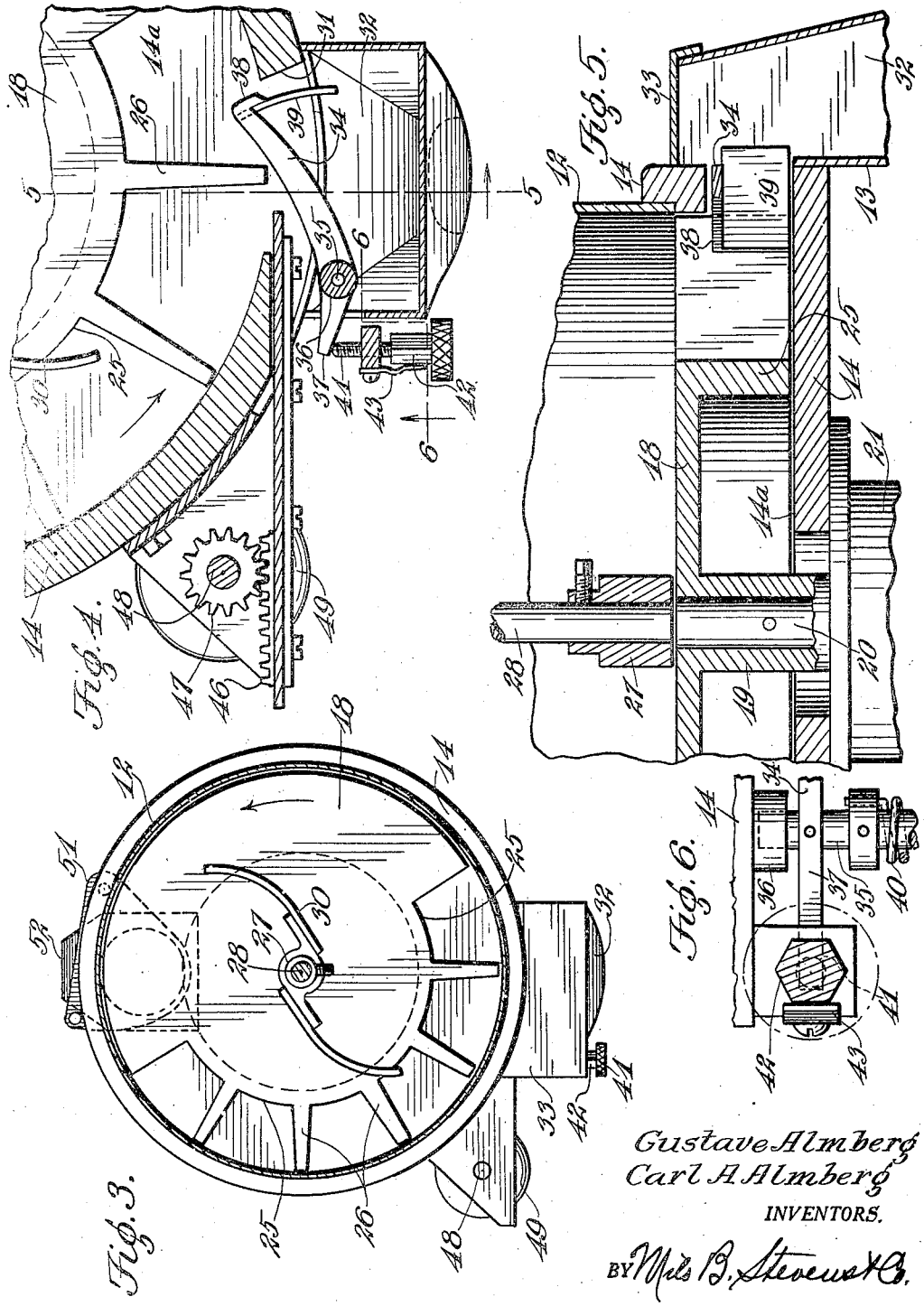

2,417,284

UNITED STATES PATENT OFFICE 2,417,284

PLURAL DISCHARGE ASSISTANT DISPENSING MACHINE

Gustave Almberg and Carl A. Almberg, Joliet, Ill.

Application January 29, 1944, Serial No. 520,280

9 Claims. (Cl. 222—227)

Our invention relates to filling machines for loose or powdered materials, such as flour, pulverized coffee, ground paints and the like, and our main object is to provide a filling machine for this class of materials which imposes a movement thereof by positive action.

A further object of the invention is to provide a machine of the above character which utilizes the bodily weight of the material to put a bottom layer of it in a path where it may be driven by the aforesaid positive action into the filling zone.

Another object of the invention is to employ a material drive which imposes a centrifugal movement to the material in the direction of the filling zone.

An additional object of the invention is to provide a measuring control which cooperates with the material drive to regulate the amount of material dispensed into the filling zone.

Another object of the invention is to provide a filling guide which cooperates with the rotary action of the material drive to procure periodical filling operations in continuous sequence.

An important object of the invention is to provide a machine of the above character which is automatic, fast in operation, simple in construction, handles fine or coarse materials, minimizes dustiness in dry powders, and prevents stickiness in oily powders.

With the above objects in view and any others which may suggest themselves from the description to follow, a better understanding of the invention may be had by reference to the accompanying drawings, in which—

Fig. 1 is a front elevation of the filling machine, with portions broken away to reveal internal parts;

Fig. 2 is a side view of Fig. 1 from the left, also partly broken away;

Fig. 3 is a section on the line 3—3 of Fig. 1;

Fig. 4 is a partial section on an enlarged scale taken on the line 4—4 of Fig. 1; and Figs. 5 and 6 are, respectively, sections on the lines 5—5 and 6—6 of Fig. 4.

Referring specifically to the drawings, it is noted that the machine is erected on a base plate 10 which may be at the top of a stand 11—only partly shown—or may rest on a table or other support which receives the bags, cans or other containers to be filled.

The base plate 10 receives an upright cylindrical housing composed of an upper section 12 and a lower section 13. The housing is of sheet metal, and its sections are separated shortly above the middle by a shallow cup 14 of cast construction, which is recessed at 15 and 16 to seat the contiguous ends of the housing sections 12 and 13. Two posts 17 inside the latter serve to support the cup 14 above the base plate 10.

The floor 14a of the cup is flat, and the latter receives a short, cylindrical rotor 18 in freely sliding relation with the said floor. The rotor has a central hub 19 secured on a vertical shaft 20 which descends into a casing 21 underneath the cup 14. The casing contains a standard speed-reducing unit (not shown); and an electric motor 22 is mounted in the bottom of the housing section 13 and extended with a belt drive 23 to the speed reducing unit. Thus, the motor at working speed will secure a slower but more powerful motion on the part of the rotor 18. An external switch 24 is provided for the control of the motor 22.

The rotor is flat over the greater portion of its top, but it is formed with a marginal series of divisions or pockets 25 separated by vertical ribs 26. Thus, the loose material in the upper section 12 of the housing is largely supported on the rotor and also fills the pockets 25 to rest on the floor 14a of the cup 14.

The rotor 18 is driven in the direction of the arrow indicated in Figs. 3 and 4, so that the material in the pockets 25 is carried in a circular path over the floor 14a. However, it is also our intention to urge the material in the lower portion of the housing section 12 in an outward direction, to which end a spider 27 is secured to a vertical rod 28 depending from a top 29 provided for the housing section 12. The spider is rigid, and it has a pair of outward blades 30 which take a curvature in the direction in which the rotor operates. Thus, the blades 30 act as cams to spread the material in an outward direction, so that it may always settle in the pockets 25.

In order that the material may be dispensed from the pockets 25 of the rotor, an opening 31 is made in the wall of the cup 14; and Fig. 4 shows that the opening 31 is in the discharge path of the rotor pockets, particularly when the rotor operates at a speed to induce a centrifugal movement of the material contained in the pockets 25.

The opening 31 of the cup 14 connects with a discharge spout 32 formed with a top 33. Under the latter is a lever 34 which is mounted on a vertical pivot 35 carried by housing brackets 36. The pivot is at an intermediate point in the course of the lever, and the latter extends with a lug 37 beyond the pivot. At the opposite end, the lever 34 is formed with a downward head piece 38 which forms a backing or support for a curved plate 39. A torsion spring 40 on the pivot 35 acts to urge the lever 34 inwardly to the position indicated in Fig. 4, this limit being determined by a set screw 41 behind the lug 37 of the lever.

Since the lever 34 is in the rotation path of the ribs 26, the lever will yield in an outward direction every time it is tripped by one of the ribs, carrying the plate 39, whose curvature is approximately on the radius of the pivot 35, outwardly over the space in the spout 32. It is now apparent that the material in a given compartment 25 will primarily issue therefrom on meeting the opening 31 with the plate 39 as a check or lateral guard. However, as the rotor proceeds to trip the lever 34, the acting rib 26 approaches and attains alinement with the plate 39, whereby to form a wall to retain the material from lateral discharge. Thus, the material by force of its centrifugal motion sweeps into the discharge spout 32, whose lower end is over the filling zone.

The motion of the rotor 18 is calculated to accumulate the dispensing action of the series of pockets 25 for a single filling. Therefore, the said motion is so rapid as to create a practically continuous flow of the cumulative material, so that to all intents and purposes a single discharge issues from the spout 32 on each revolution of the rotor. Since the compartments 25 occupy only half of the rotor circumference, it follows that an inactive interval in the filling operation occurs on each revolution of the rotor, which allows the necessary time for the next bag, can or other container to be moved under the spout before the next filling operation.

It is noted that the set screw 41 has a hexagonal shank 42 which is engaged by a spring-detent 43, whereby to fix the adjustment of the set screw in relation to the lug 37 of the lever 34. It is thus possible to set the advance of the latter for proper cooperation with the rotor 18. Also, the amount of discharge from the rotor compartments is controllable by a slide 44 carried by a bracket 45 alongside the cup 14. The slide carries a gear rack 46 with which a pinion 47 on a vertical shaft 48 is meshed, the lower end of the shaft having a knob 49 by means of which the gear may be turned to advance or retract the slide 44 in respect to the cup opening 31.

With the capacity of the pockets 25 determined, it is possible to estimate in a general way the amount of material that is expelled by the rotor into the zone of discharge. By making the adjustments of the lever 34 and the slide 44 described above, the amount dispensed may be controlled to a point of accuracy, whereby to determine the quantity at each filling. It will also be noted that the slide enters the housing in a plane tangential to the inner surface of its wall, so that the inner surfaces of the slide and wall are substantially even. The slide is therefore close to the rotor periphery and provides a more accurate discharge flow between the filling and non-filling periods of the moving rotor. The intimacy of the slide with the peripheral rotor path also deters material working back of the rotor cavity or spokes into the non-filling section of the rotor.

Hinged lids 50 are provided at the top of the housing to facilitate loading from either side; and a clean-out opening in the rear portion of the cup floor 14a is controlled by a slide 51 to communicate with a rearward spout 52.

With the machine in operation on the theory described, the fluidity of the material is not depended upon to any appreciable extent to procure its discharge. In other words, the machine impels the material in the pockets 25 positively and with centrifugal force to the discharge controls. Therefore, the speed of the rotor to accomplish filling operations may be made as fast as it is possible to supply the containers being filled, rendering the machine highly efficient from the viewpoint of production. Also, the handling of the material involves spacious pockets and simple elements, so that a slightly sticky or oily consistency of the material will not prevent its continuous clearance or movement through the machine. On the other hand, the dissipation of dusty materials is largely checked by the closed form of the housing. Further, with the machine operating on a timed basis, it may be easily connected with accessory machines or conveyors automatically operative in respect to the item being filled. Finally, it will be apparent that the novel machine is built of a few and simple parts which are rugged in construction, operate in accordance with logical mechanical principles and are capable of being economically produced.

While we have described the invention along specific lines, various minor changes or refinements may be made therein without departing from its principle, and we desire to consider such changes and refinements as coming within the scope and spirit of the appended claims.

We claim:

1. In a filling machine for powdered materials and the like, an upright cylindrical housing receiving the material and having a floor, a vertically-centered rotor over the floor and covering a portion thereof, said rotor and the remaining portion of the floor serving to support the material, and means to urge the material on the rotor to the outer regions thereof and upon said remaining floor portion on the operation of the rotor, said means including a support in the upper part of the housing, a center rod depending from the support, and a spider carried by the lower end of the rod over the rotor, the arms of the spider extending outwardly with curves in the direction of the rotor's motion.

2. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, a movably carried deflector plate in said outlet and normally extending into the cavity in the rotating path of the partitions to intercept material tending to be carried past the outlet, and means to carry the deflector plate out of said path on the passage of each partition along said outlet.

3. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, a movably carried deflector plate in said outlet and normally extending into the cavity in the rotating path of the partitions to intercept material tending to be carried past the outlet, and means tripped by each partition passing said outlet and effective to carry the deflector plate out of said path.

4. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, a movably carried deflector plate in said outlet and normally extending into the cavity in the rotating path of the partitions to intercept material tending to be carried past the outlet, and means to carry the deflector plate out of said path on the passage of each partition along said outlet, said deflector plate being concave on the side of approach by the partitions to train outgoing material into the confines of the outlet.

5. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, a movably carried deflector plate in said outlet and normally extending into the cavity in the rotating path of the partitions to intercept material tending to be carried past the outlet, and means to carry the deflector plate out of said path on the passage of each partition along said outlet, said means comprising an arm pivoted vertically in one side of the outlet, and the free end of the arm carrying the deflector plate.

6. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, a movably carried deflector plate in said outlet and normally extending into the cavity in the rotating path of the partitions to intercept material tending to be carried past the outlet, and means to carry the deflector plate out of said path on the passage of each partition along said outlet, said means comprising an arm pivoted vertically in the side of the outlet first passed by the rotor partitions, and the free end of the arm carrying the deflector plate.

7. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, an arm vertically pivoted in said outlet and carrying a deflector plate at its free end, the arm being normally positioned to project the deflector plate in the rotating path of the partitions to intercept material tending to be carried past the outlet and momentarily tripped on the passage of the partitions to carry the deflector plate out of said path, and yieldable means urging the arm into the normal position.

8. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, an arm vertically pivoted in said outlet and carrying a deflector plate at its free end, the arm being normally positioned to project the deflector plate in the rotating path of the partitions to intercept material tending to be carried past the outlet and momentarily tripped on the passage of the partitions to carry the deflector plate out of said path, and means for adjusting the arm to vary its normal position relative to said path.

9. In a filling machine for powdered materials or the like, an upright cylindrical housing receiving the material and having a floor, a vertically-centered rotor over the floor and of equal area as the same except for a part-circumferential cavity, means to train the material into said cavity, an outlet in the wall of the housing opposite the cavity for the discharge of material from the same by centrifugal motion during the operation of the rotor, the rotor having a series of circumferentially-spaced partitions extending outwardly into said cavity, an arm vertically pivoted in said outlet and carrying a deflector plate at its free end, the arm being normally positioned to project the deflector plate in the rotating path of the partitions to intercept material tending to be carried past the outlet and momentarily tripped on the passage of the partitions to carry the deflector plate out of said path, yieldable means urging the arm into the normal position, a lug extending from the arm beyond the pivot, and an adjusting screw effective on the lug to lock the advance of the arm as induced by said yieldable means at any point chosen in relation to said path.

GUSTAVE ALMBERG.
CARL A. ALMBERG.

REFERENCES CITED

The following references are of record in the file of this patent:

UNITED STATES PATENTS

| Number | Name | Date |
| --- | --- | --- |
| 780,106 | Jones | Jan. 17, 1905 |
| 488,650 | Dodd | Dec. 27, 1892 |
| 479,637 | Everett | July 26, 1892 |
| 439,495 | Everett | Oct. 28, 1890 |
| 1,040,642 | Dalton | Oct. 8, 1912 |
| 1,940,138 | McAdam | Dec. 19, 1933 |
| 222,478 | Everett | Dec. 9, 1879 |
| 1,936,105 | Cole | Nov. 21, 1933 |
| 2,121,486 | Merchen | June 21, 1938 |
| 1,462,649 | MacLellan | July 24, 1923 |
| 1,679,557 | Bailey | Aug. 7, 1928 |